US010086713B2

(12) United States Patent
Von Novak, III et al.

(10) Patent No.: US 10,086,713 B2
(45) Date of Patent: Oct. 2, 2018

(54) WIRELESS POWER TRANSFER FOR INTEGRATED CYCLE DRIVE SYSTEMS

(71) Applicant: QUALCOMM Incorporated, San Diego, CA (US)

(72) Inventors: William Henry Von Novak, III, San Diego, CA (US); Linda Stacey Irish, San Diego, CA (US); Virginia Walker Keating, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 114 days.

(21) Appl. No.: 15/190,259

(22) Filed: Jun. 23, 2016

(65) Prior Publication Data

US 2017/0368943 A1    Dec. 28, 2017

(51) Int. Cl.
*H02J 7/00* (2006.01)
*B60L 11/18* (2006.01)
(Continued)

(52) U.S. Cl.
CPC .......... *B60L 11/182* (2013.01); *B60L 11/1825* (2013.01); *B62M 6/00* (2013.01);
(Continued)

(58) Field of Classification Search
CPC .... H02J 5/005; H02J 7/025; H02J 7/35; H02J 50/00–50/90; H02J 7/02; H02J 17/00; H04B 5/00
(Continued)

(56) References Cited

U.S. PATENT DOCUMENTS

| 6,150,794 A | * | 11/2000 | Yamada | B60L 11/007 320/108 |
| 8,151,924 B2 | | 4/2012 | Radtke et al. | |
| 9,085,334 B2 | | 7/2015 | Hoffmann et al. | |
| 2011/0048830 A1 | * | 3/2011 | Radtke | B62M 6/45 180/206.5 |
| 2011/0133542 A1 | | 6/2011 | Ratti et al. | |

(Continued)

FOREIGN PATENT DOCUMENTS

DE   102010034175 A1   2/2012
EP       2450921 A1    5/2012
(Continued)

OTHER PUBLICATIONS

Singh T., "Awesome Flux Bike Charges Your Gadgets on the Go," 2014, 4 pages. Retrieved from the Internet: URL: http://inhabitat.com/awesomefluxbikechargesyourgadgetsonthego/ [retrieved on Mar. 23, 2016].

(Continued)

*Primary Examiner* — Arun Williams
(74) *Attorney, Agent, or Firm* — Smith Tempel Blaha LLC/ Qualcomm

(57) ABSTRACT

Wireless power transfer for integrated cycle drive systems is described. A cycle power system includes a rim that is connected to, and positioned concentrically with, a sealed housing that can rotate about an axis. The cycle power system also includes an integrated drive system disposed within the housing. The integrated drive system includes a battery and a motor for driving a cycle by causing rotational movement of the rim about the axis. Additionally, the cycle power system includes an inductive structure that is disposed within the housing, and that wirelessly charges the battery through induction between the inductive structure and remote a charging station.

28 Claims, 9 Drawing Sheets

(51) Int. Cl.
  *H02J 50/12*  (2016.01)
  *B62M 6/40*  (2010.01)
  *B62M 6/90*  (2010.01)
  *H02J 7/02*  (2016.01)
  *B62M 6/00*  (2010.01)
  *H02J 5/00*  (2016.01)
  *H02J 50/10*  (2016.01)

(52) U.S. Cl.
  CPC ............... *B62M 6/40* (2013.01); *B62M 6/90* (2013.01); *H02J 5/005* (2013.01); *H02J 7/025* (2013.01); *H02J 50/10* (2016.02); *H02J 50/12* (2016.02)

(58) Field of Classification Search
  USPC ........................................................ 320/108
  See application file for complete search history.

(56) References Cited

U.S. PATENT DOCUMENTS

2015/0311954 A1\* 10/2015 Tetsuka ................ H04B 5/0081
                        307/104
2016/0352148 A1\* 12/2016 Ichikawa ................ G01L 3/101

FOREIGN PATENT DOCUMENTS

| GB | 2495640 A | 4/2013 |
|---|---|---|
| JP | H1075535 A | 3/1998 |
| WO | 2010077300 A2 | 7/2010 |

OTHER PUBLICATIONS

International Search Report and Written Opinion—PCT/US2017/033247—ISA/EPO—dated Aug. 23, 2017.

\* cited by examiner

US 10,086,713 B2

WIRELESS POWER TRANSFER FOR INTEGRATED CYCLE DRIVE SYSTEMS

TECHNICAL FIELD

This disclosure relates generally to transferring power wirelessly into and out of integrated cycle drive systems, including systems that package components of a drive system within a wheel of a cycle.

BACKGROUND

Bicycles can be converted into electric bicycles by replacing a wheel with a motorized wheel. Simple conversion kits include external components, such as batteries and controllers. Recent developments, such as a Copenhagen Wheel, have designed the motorized wheel to include almost all components internally. In these designs, motor magnets can move while other components remain stationary and fixed to a hub of the wheel. While these components are internal, an external connection is still required for charging of the batteries and powering of accessories. This external connection can result in a potential leak point, which increases the risk of corrosion or damage from exposure to moisture or road salt. Another problem with external connections is the risk of failure from fatigue (e.g., plugging and unplugging a charging cord).

SUMMARY

Techniques for wireless power-transfer for integrated cycle drive systems are described. In one or more implementations, a cycle power system includes a rim that is connected to, and positioned concentrically with, a sealed housing that can rotate about an axis. The cycle power system also includes an integrated drive system disposed within the housing. The integrated drive system includes a battery and a motor for driving a cycle by causing rotational movement of the rim about the axis. Additionally, the cycle power system includes an inductive structure that is disposed within the housing, and that wirelessly charges the battery through induction between the inductive structure and a remote charging station.

In an example aspect, a method for wireless power transfer of a cycle power system is described. The method includes locating a side of a wheel of a cycle proximate to a charging device having a wireless-charging transmit coil. In addition, the method includes substantially aligning an inductive structure associated with the wheel with the wireless-charging transmit coil in the charging device. In embodiments, the inductive structure is disposed within a sealed housing that is positioned concentrically with a rim of the wheel. The method further includes wirelessly charging a battery of the cycle power system through induction using the inductive structure and the wireless-charging transmit coil. In implementations, the battery is disposed within the sealed housing and supplies electrical energy to a motor that is also disposed within the housing. The motor can cause rotational movement of the rim of the wheel to drive the cycle.

In an example aspect, a passive power-transfer system is described that includes a member and an inductive structure. The member is capable of being positioned proximate to a rim of a wheel of a cycle, and the inductive structure is connected to the member. The inductive structure electrically connects to accessories of the cycle. In addition, the inductive structure transfers electrical energy to the accessories of the cycle to electrically power the accessories. In embodiments, the transfer of electrical energy is based on inductive power received from a wheel-mounted inductive structure connected to the rim of the cycle.

In an example aspect, a method for passive power-transfer is described. The method includes electrically connecting an inductive structure to accessories of a cycle, where the inductive structure is disposed on a member that is positioned proximate to a rim of a wheel of the cycle. The method further includes transferring electrical energy to the accessories based on inductive power received from a wheel-mounted inductive structure that is connected to the rim of the cycle.

BRIEF DESCRIPTION OF DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Conventional electric bicycles generally include a motorized wheel that requires charging via an external connection. An external connection, however, can result in a potential weak point, risking failure from fatigue associated with connecting/disconnecting charging cords, and a potential leak point, risking corrosion or damage from exposure to moisture or road salt.

To address these problems, wireless power-transfer for integrated cycle drive systems are described. For example, a wireless power transmit/receive coil can be positioned within a wheel of an integrated cycle drive system to allow both charging of the drive system and powering of accessories. The coil can wirelessly receive large amounts of power to charge a battery of the drive system. In addition, the coil can transmit small amounts of power during operation of the bicycle to power accessories, such as lights (e.g., headlight, taillight), a mobile device, a horn, a cellular phone, an electronic payment system or device, and so on. Because the coil enables wireless charging of the battery of the drive system and wireless powering of accessories, a housing of the drive system can be completely sealed, thereby substantially eliminating potential leak points as well as external connection points that are subject to fatigue.

Figure 1:
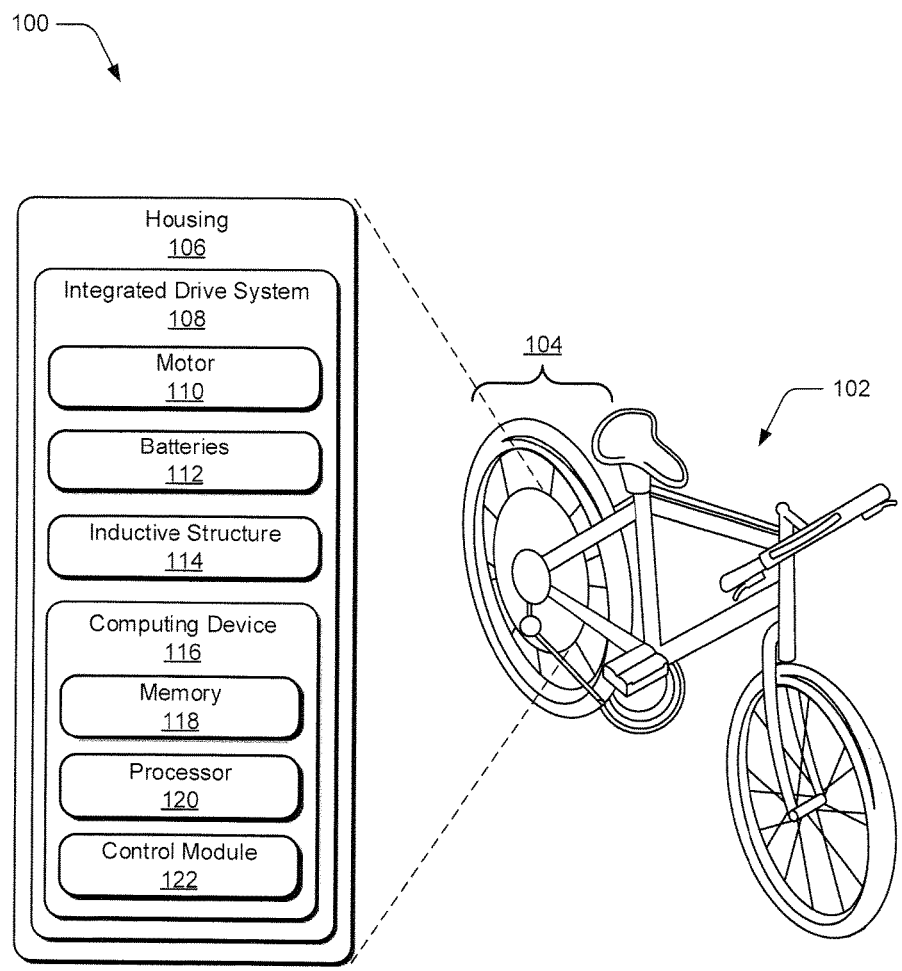
FIG. 1 illustrates an example cycle power system associated with a cycle in accordance with one or more embodiments.

FIG. 1 illustrates an example implementation 100 of a wireless power-transfer system associated with a bicycle 102 in accordance with one or more embodiments. For example, the bicycle 102 includes a rear wheel 104 having a housing 106 with an integrated drive system 108 disposed within the housing 106. The integrated drive system 108 includes various components that operate to drive the wheel 104 of the bicycle. Although the example implementation 100 describes a bicycle, any cycle (e.g., unicycle, tricycle, motorcycle, scooter, rickshaw, and so on) can be used implement the wireless power-transfer system described herein.

The integrated drive system 108 includes a motor 110, one or more batteries 112, an inductive structure 114, and a computing device 116. The motor 110 is operative to drive the wheel 104 of the bicycle 102. The batteries 112 are rechargeable and operative to provide electrical power to the motor 110.

The inductive structure 114 is operable to charge the batteries 112 through induction between the inductive structure 114 and a charging station. In addition to charging the batteries 112, the inductive structure 114 can also transfer power through induction to accessories (e.g., lights, mobile phone, horn, and so on) of the bicycle 102, further discussion of which is provided below. In implementations, the inductive structure 114 can include a coil-shaped structure or multiple coil-shaped structures. For instance, the inductive structure 114 can include a transmit/receive coil that can receive power from an electromagnetic field and convert that power into electric current to charge the batteries 112. The inductive structure 114 can also convert electric current received from the batteries 112 into an electromagnetic field to transfer power out to another inductive structure for powering the accessories. Further discussion of the inductive structure 114 is provided below in more detail.

The integrated drive system 108 is also illustrated as including a computing device 116 having a memory 118, a processor 120, and a control module 122. The processor 120 is configured to execute instructions stored in the memory 118 to implement the control module 122. The control module 122 is representative of functionality to control a wide variety of operations. For example, the control module 122 can control the motor 110, determine a charge level of the batteries 112, control power transmitted to the accessories, and so on. Accordingly, the control module 122 is representative of a wide variety of functionalities to control different aspects of the integrated drive system 108 and cycle accessories.

Figure 2:
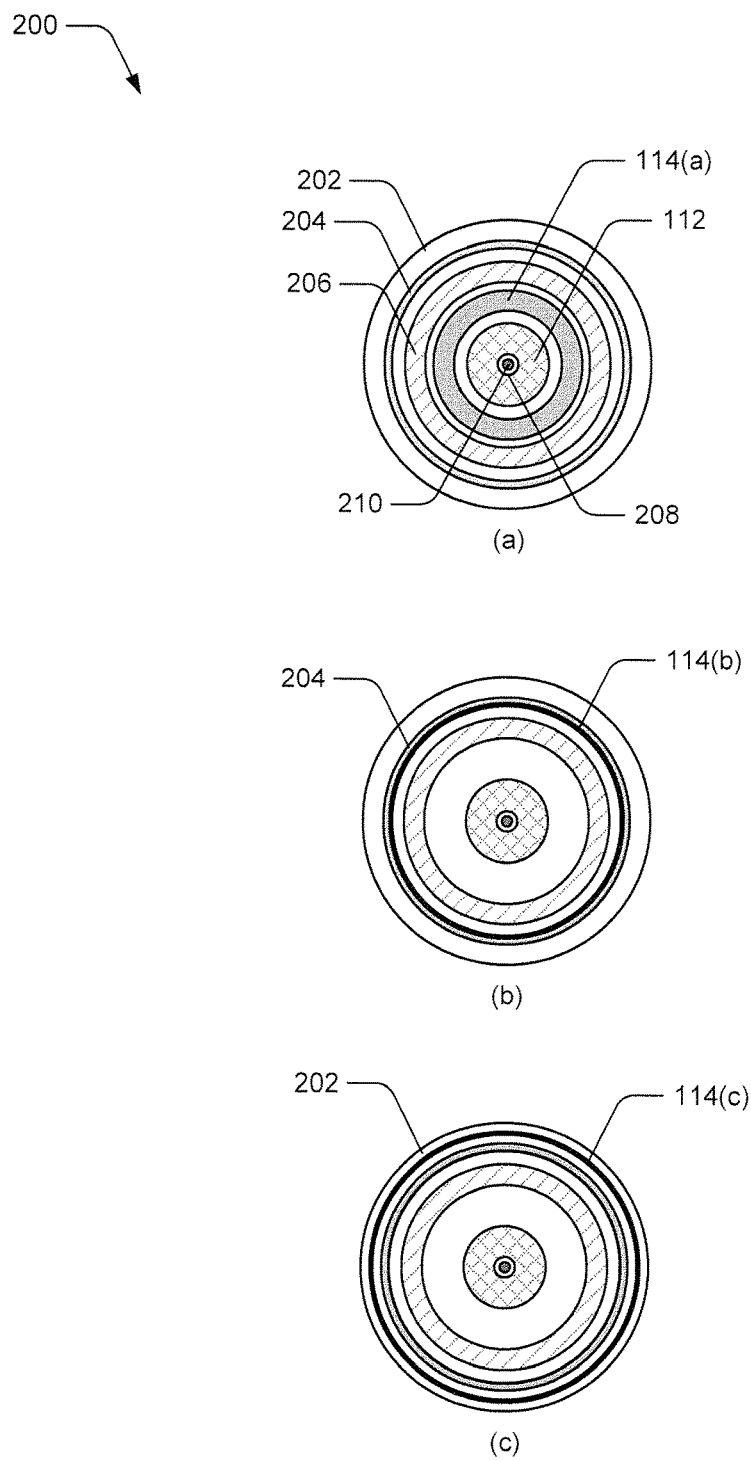
FIG. 2 depicts example implementations of cycle power systems in accordance with one or more embodiments.

FIG. 2 depicts example implementations of cycle power systems in accordance with one or more embodiments. In "(a)", a wheel is illustrated including a tire 202, a rim 204, rotating magnets 206, an inductive structure 114(a) (e.g., power coil), batteries 112, a hub 208, and an axle 210. Here, the inductive structure 114(a) can include a power coil that is positioned concentrically with the rim 204, the hub 208, and the axle 210. In this example implementation, the inductive structure 114(a) is positioned relatively closer to the hub 208 than the rotating magnets 206.

Alternatively, the inductive structure can be disposed on the rim 204, as illustrated in "(b)". Locating the inductive structure 114(b) on the rim may be advantageous because the large diameter of the rim allows power to be transferred over greater distances between the inductive structure 114(b) and a charger. Considering the size of the bicycle and the space available to park the bicycle, a distance between the inductive structure 114(b) and the charger can be several inches or feet. The power can be transferred through induction over a distance several times the diameter of the inductive structure 114(b). Considering the size of the rim, the power can be transferred over several feet. Smaller distances, however, may increase efficiency of the power transmission.

Another alternative location for the inductive structure is within the tire 202, as illustrated in "(c)". For example, the inductive structure 114(c) can be embedded in an inner tube located within the tire, or within the tire itself. In some instances, the inductive structure 114(c) can be located between the tire 202 and the inner tube, such as in a conventional location of flat-prevention strips (e.g., interfacing between the inner tube and the rim). While various example locations are illustrated and discussed in FIG. 2 for the inductive structure 114(c), any of a variety of locations on or within the wheel can be utilized.

Common wheel sizes for bicycles include 26 and 29 inch (also referred to as 700 C) diameters. These provide bead seating diameters of 559 mm and 622 mm, respectively. Bead seating diameter is the location where the tire seats in the rim. Accordingly, coils of 500 mm or 570 mm diameter can interface well with common wheel sizes. Larger coil sizes can alternatively be used to increase power transfer, such as by embedding the coil in the tire, inner tube, or between the tire and tube, as described above. Due to the large size of the coils, low frequencies can be used for the induction. Some example low frequencies include frequencies within a range of 100 to 300 KHz. However, to reduce induction heating, a higher frequency (e.g., 6.78 MHz) can be utilized.

Figure 3:
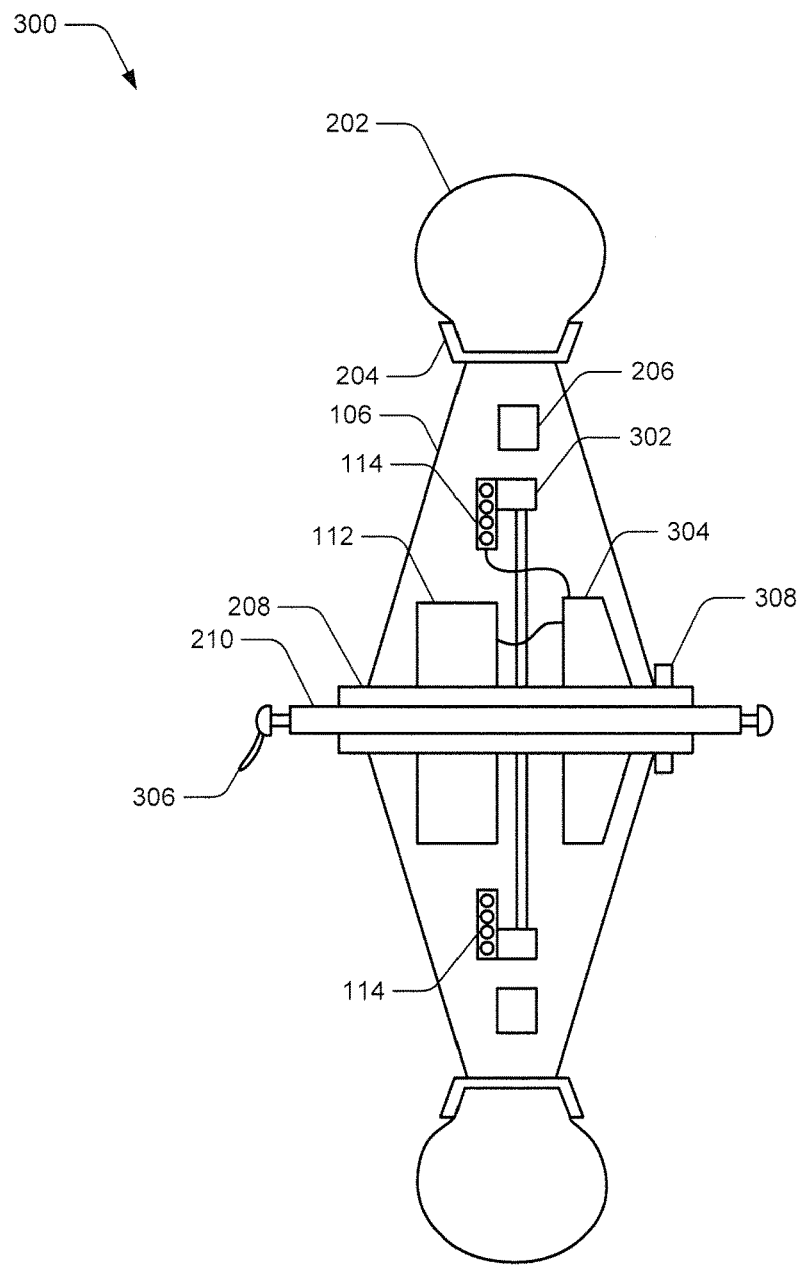
FIG. 3 illustrates a cut-away view of an example implementation of a wheel having a cycle power system in accordance with one or more embodiments.

FIG. 3 illustrates a cut-away view of an example implementation 300 of a wheel having an integrated drive system in accordance with one or more embodiments. In implementations, the wheel includes a rim, such as rim 204 from FIG. 2, that can receive a tire 202. In addition, the wheel includes a housing, such as housing 106 from FIG. 1. The housing 106 can extend to the rim 204 and be connected directly to the rim 204, or the housing 106 can be connected to the rim 204 via an intermediate component, such as spokes. Positioned within the housing 106 are components of the integrated drive system, such as rotating magnets 206, fixed motor windings 302, electronics 304, and batteries 112. Also included within the housing 106 is the inductive structure 114. In at least one embodiment, these components are concentric and/or coaxial around a hub 208 and an axle 210. Exterior to the housing 106 are a quick release lever 306 and a sprocket 308.

The motor windings 302, the batteries 112, the electronics 304, and the inductive structure 114 can be fixed to the axle 210 and not rotate. The rotating magnets 206, however, rotate with the housing 106 and the rim 204. The housing 106 and/or the rim 204 can be formed from a variety of materials, such as a non-metallic composite. Alternatively, the housing 106 can be replaced by metal spokes. As long as the spokes are radial, interference with power transmission is minimized. The rim 204 can be formed from a nonconductive material, or a conductive material having insulated "breaks" in the metal to prevent eddy current generation.

The motor windings 302 interact with the rotating magnets 206 to drive the wheel by causing rotational movement of the rim 204 about the axle 210. More specifically, the motor windings 302 cause rotational movement of the rotating magnets 206, which in turn cause corresponding rotational movement of the housing 106 and the rim 204 based on a physical connection between the rotating magnets 206, the housing 106, and the rim 204. The sprocket 308 allows human power to drive the wheel in a variety of conventional manners, such as via pedals connected to a front sprocket, with a chain interfacing between the front sprocket and the sprocket 308.

When the wheel is positioned proximate to a charging station, magnetic flux (e.g., an alternating magnetic field) is received by the inductive structure 114 and converted into an electrical current. A distance between the inductive structure 114 and the charging station can affect how much of the magnetic flux generated by the charging station penetrates the inductive structure 114 and contributes to the power transmission. More flux reaching the inductive structure 114 increases efficiency in the power transmission and reduces losses and heating. The electrical current is then passed to the electronics 304 and the batteries 112 for charging. Alternatively, the electrical current can be passed directly to the batteries 112 to charge the batteries 112.

Figure 4:
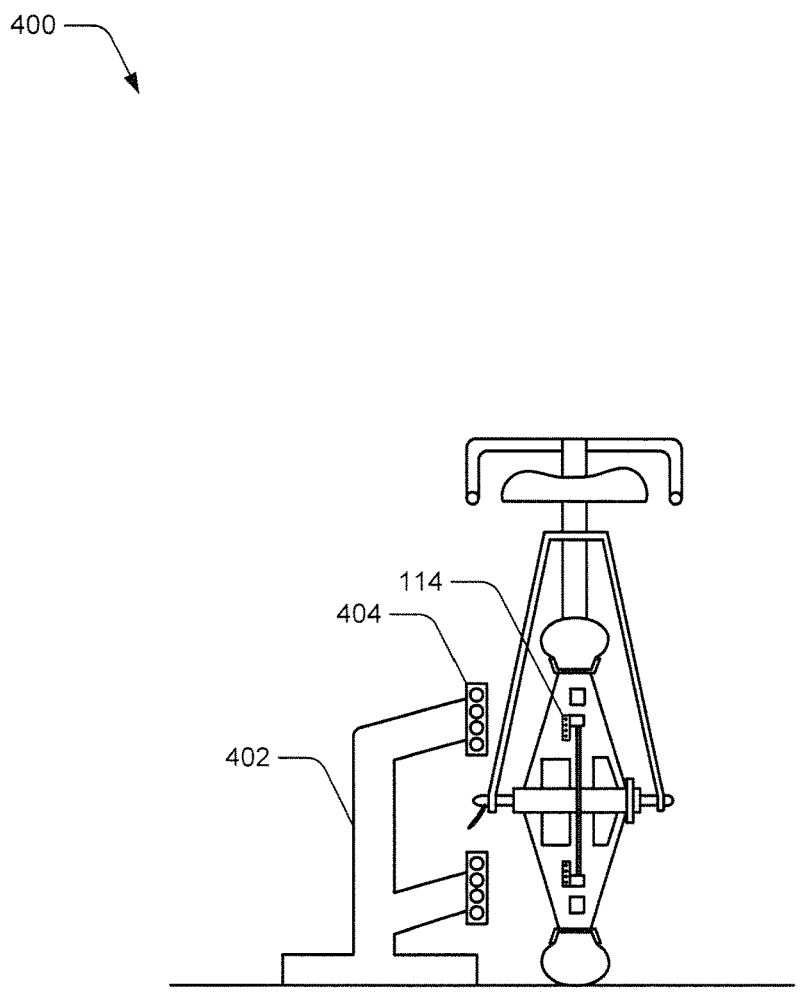
FIG. 4 illustrates a cut away view of an example implementation of a cycle power system and a charging station in accordance with one or more embodiments.

FIG. 4 illustrates a cut away view of an example implementation 400 of a cycle power system and a charging station in accordance with one or more embodiments. In the example implementation 400, the wheel of the bicycle is positioned near a charger 402. The charger includes a wireless-charging transmit coil 404 that generates magnetic flux that is receivable by the inductive structure 114 in the wheel when the inductive structure 114 is substantially aligned with the wireless-charging transmit coil 404.

The transmit coil in the charging station can be shaped substantially similar to the inductive structure 114 in the wheel, such as a coil-shaped structure having a diameter similar to that of the inductive structure 114. Alternatively, the transmit coil may be shaped differently than the inductive structure 114, such as with a different diameter or different shape. The power transmission may have reduced efficiency when the inductive structure 114 and the transmit coil are shaped substantially different from one another, however.

Figure 5:
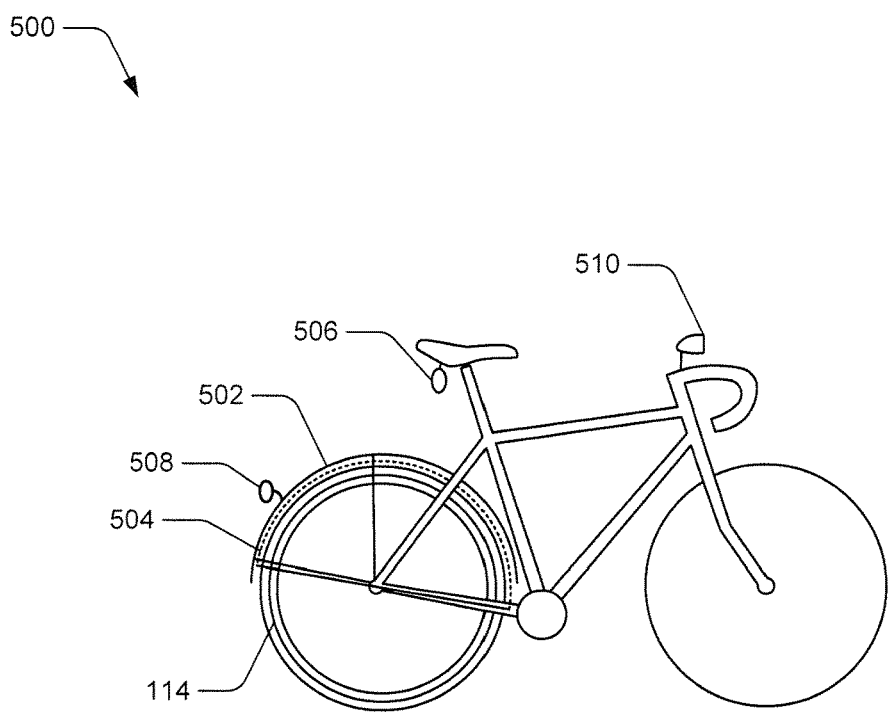
FIG. 5 depicts example implementations of passive power-transfer systems in accordance with one or more embodiments.
Figure 5:
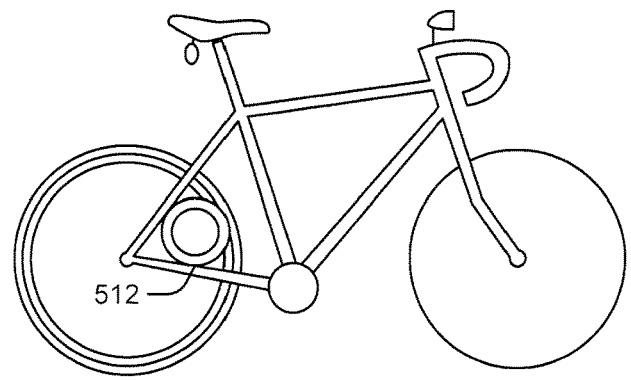

FIG. 5 depicts example implementations 500 of passive power-transfer systems in accordance with one or more embodiments. In implementations, a passive power-transfer system can include a member 502 positioned proximate to the rim of the cycle, and an inductive structure 504 connected to the member 502. In one example, the member 502 can include a fender mounted to a frame to cover a portion of the tire or rim of the rear wheel of the bicycle. Further, the inductive structure 504 (denoted by a dashed line) can be connected to the fender such that the inductive structure 504 is positioned to be at least partially aligned with the inductive structure 114 on the wheel. Using induction between the inductive structure 114 and the inductive structure 504, electrical power can be transferred from the integrated drive system in the wheel to accessories of the bicycle, such as taillights 506 and 508 and/or headlight 510. For example, the integrated drive system of the wheel transfers electrical current to the inductive structure 114 in the wheel, and the inductive structure 114 converts the current into magnetic flux, which is transferred to the inductive structure 504, converted into electrical current, and passed to the accessories 506-510.

If an accessory, such as taillight 508, is attached to the fender, the fender configuration of the passive power-transfer system can be a complete separate system from the frame of the cycle, thus comprising an easy add-on accessory for the cycle. Notice that the passive power-transfer system, such as the fender configuration, does not include a battery nor is it physically connected to a battery. Rather, power is supplied by the battery of the integrated drive system that is located within the housing of the wheel, as illustrated in FIGS. 1, 3, and 4. This allows the passive power-transfer system to truly be passive, but may also be used to power the accessories 506-510.

Alternatively, the inductive structure 504 can be formed as a frame-mounted coil 512 that is connected to the frame of the bicycle. Accordingly, the passive power-transfer system can be positioned in a variety of locations near the inductive structure 114 in the wheel. Because the frame-mounted coil 512 is a fraction of the area of the inductive structure 114 in the wheel, coupling between the two may be poor (e.g., k=0.05 without resonance). With resonance, however, the coupling between the inductive structure 114 and the frame-mounted coil 512 is significantly improved (e.g., k=0.3 to 0.4). A moderate amount of coupling may be sufficient to power accessories that use small amounts of power. For example, headlights and taillights may use 1-10 watts and can be powered using a moderate amount of coupling.

The accessories 506-510 can be controlled based on acceleration or deceleration of the cycle. For instance, the control module 122 of FIG. 1 can determine an acceleration or deceleration of the wheel using any of a variety of techniques, such as accelerometers. Thus, the control module 122 can send a signal to the taillight 506 or 508 to flash or increase its brightness during braking. Additionally, the inductive structure 114 in the wheel can be used to sense impedance shifts caused by an approaching metal object, such as an automobile. These impedance shifts can be used to control the accessories 506-510. For example, the impedance shifts can be used as a trigger to brighten or flash the taillight 506 or 508, sound a horn, or initiate some other action.

Figure 6:
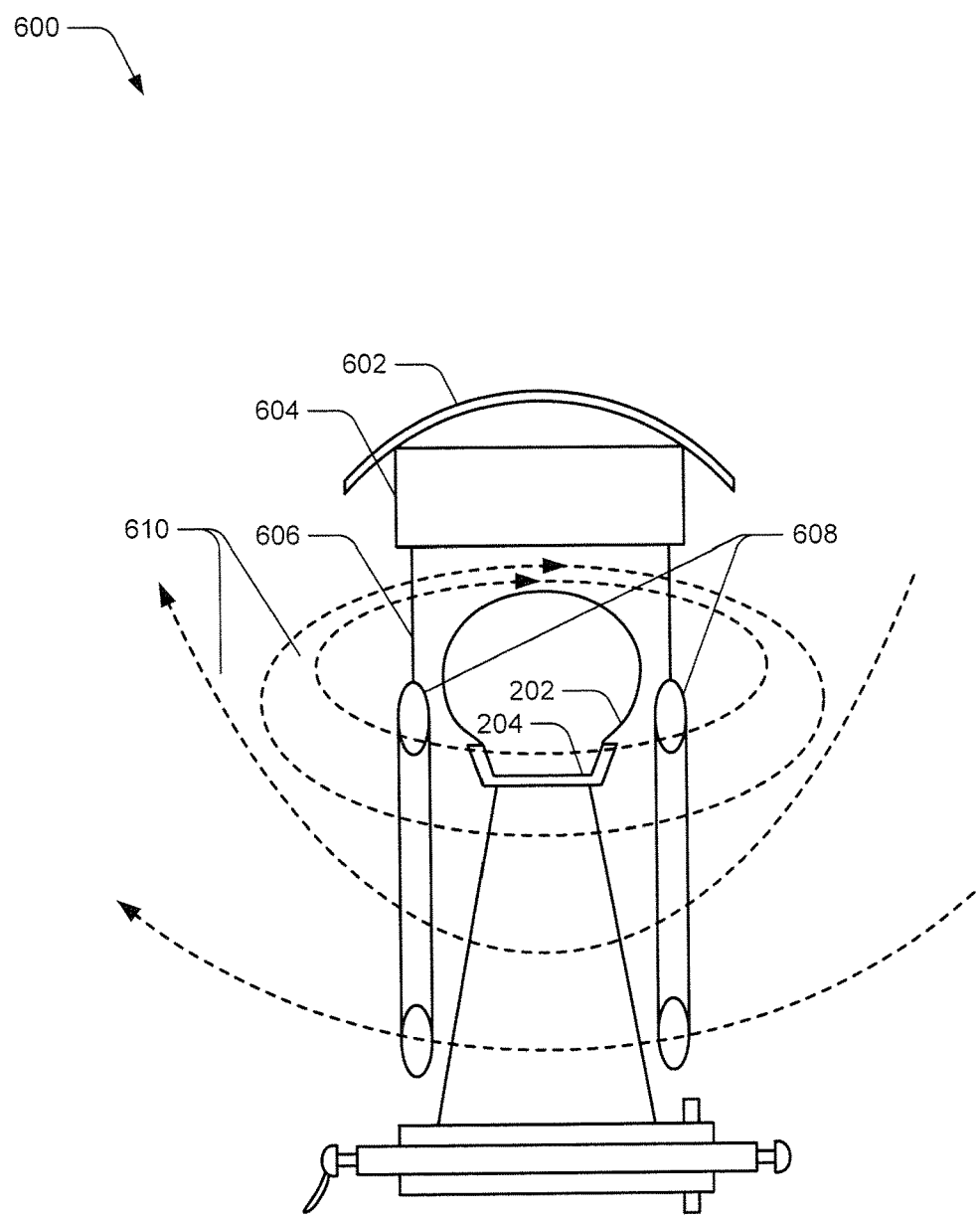
FIG. 6 depicts an example implementation of a passive power-transfer system in accordance with one or more embodiments.

FIG. 6 depicts an example implementation 600 of a passive power-transfer system in accordance with one or more embodiments. The illustration in FIG. 6 includes a section view of the wheel described above in relation to FIGS. 2-5, where the cutting plane of the section view is along a radius of the wheel. In implementations, an inductive structure (e.g., inductive structures 504, 512) is positioned between the tire 202 and component 602. The component 602 represents a portion of the frame or a removable member such as a fender that is attachable to the frame. The inductive structure is illustrated as including at least a power converter 604, wires 606, and coils 608. The wires 606 electrically connect the power converter 604 to the coils 608. The coils 608 can be positioned on one or more sides of the wheel. In implementations, the coils 608 are sized to be at least partially aligned with a wheel-mounted inductive structure, such as described above in relation to FIG. 5. When the wheel-mounted coil generates a magnetic flux, such as magnetic flux 610 (illustrated as dashed lines), the magnetic flux is transmitted through the coils 608 and the wheel, and then circulates back outside of the wheel. The magnetic flux 610 induces an alternating current in the coils 608, which passes through the wires 606 to the power converter 604.

The power converter 604 then converts the alternating current into direct current (DC) power for powering accessories.

Figure 7:
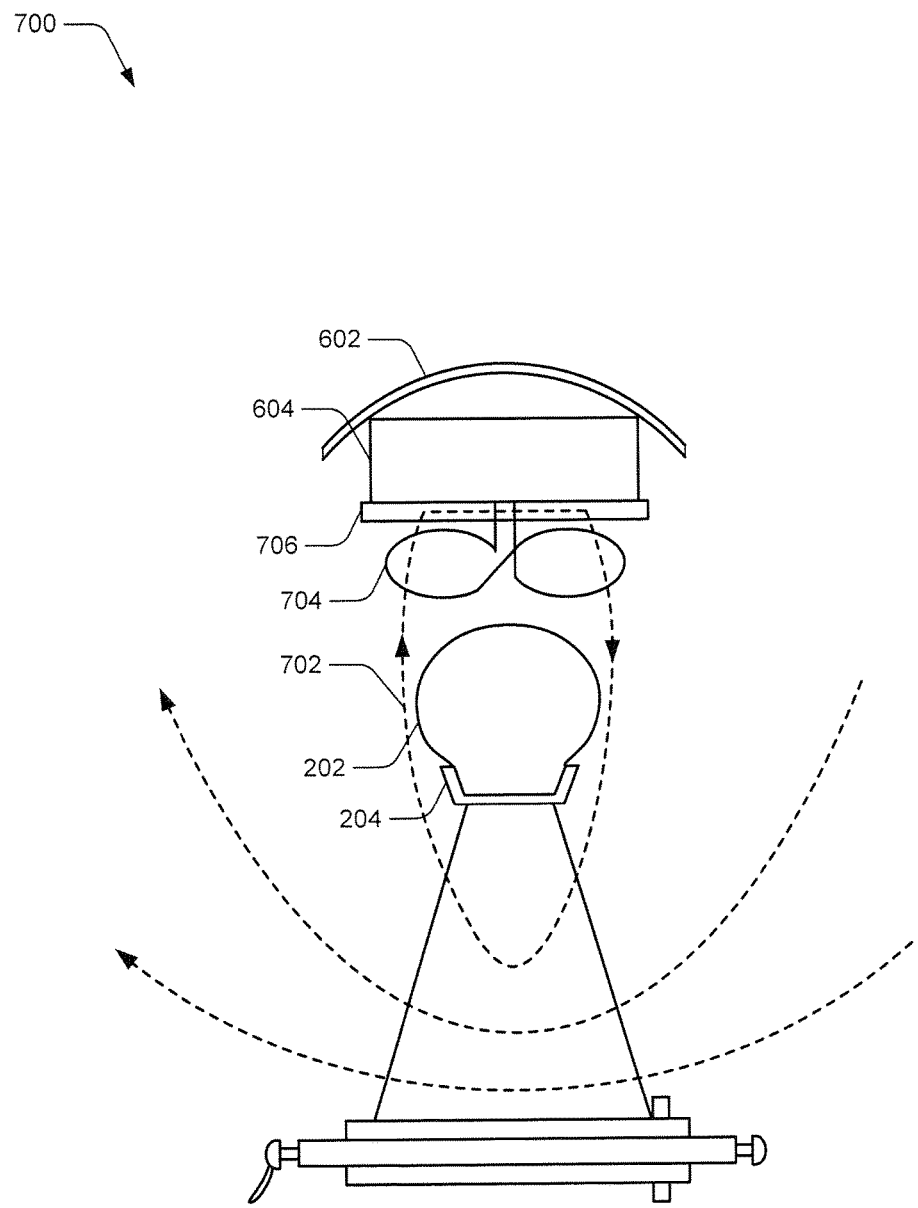
FIG. 7 depicts an example implementation of a passive power-transfer system in accordance with one or more embodiments.

FIG. 7 depicts an example implementation 700 of a passive power-transfer system in accordance with one or more embodiments. The illustration in FIG. 7 includes an alternative inductive structure in comparison to FIG. 6. In the illustrated example, a wheel-mounted inductive structure generates magnetic flux (illustrated as dashed lines) having a standard solenoid distribution. A portion of the flux 702 wraps around, or passes near, the rim 204 and the tire 202. This portion of the flux 702 is captured by a coil 704 positioned proximate to the tire 202. The coil 704 represents a coil wound in opposite directions on either side. For example, a left side of the coil 704 includes left-hand turns and a right side of the coil 704 includes right-hand turns. Alternatively, the left-hand turns can be located on the right side while the right-hand turns are located on the left side. This coil configuration allows the magnetic flux to pass through the coil 704 in two different directions, which reinforces the current generated in the inductive structure rather than opposing the current. For example, the portion of the flux 702 is illustrated as going "in" to the coil 702 on the one side (e.g., left-hand side) and coming "out" of the coil 702 on the opposing side (e.g., right-hand side).

In addition, a conductive material, such as ferrite 706 or other suitable material, is disposed proximate to the coil 704 to concentrate and direct the received magnetic flux. In the illustrated example, the portion of the flux 702 passing through one side of the coil 704 encounters the ferrite 706, passes directly across the ferrite 706, and exits the other side of the ferrite 706 through the opposing side of the coil 704. In addition, the ferrite 706 is connected to the power converter 604, which is configured to convert the portion of the flux 702 passing through the ferrite 706 into DC power for powering accessories. As described above, the power converter 604 can be connected to component 602, which represents a portion of the frame or a fender connected to the frame of the cycle.

Figure 8:
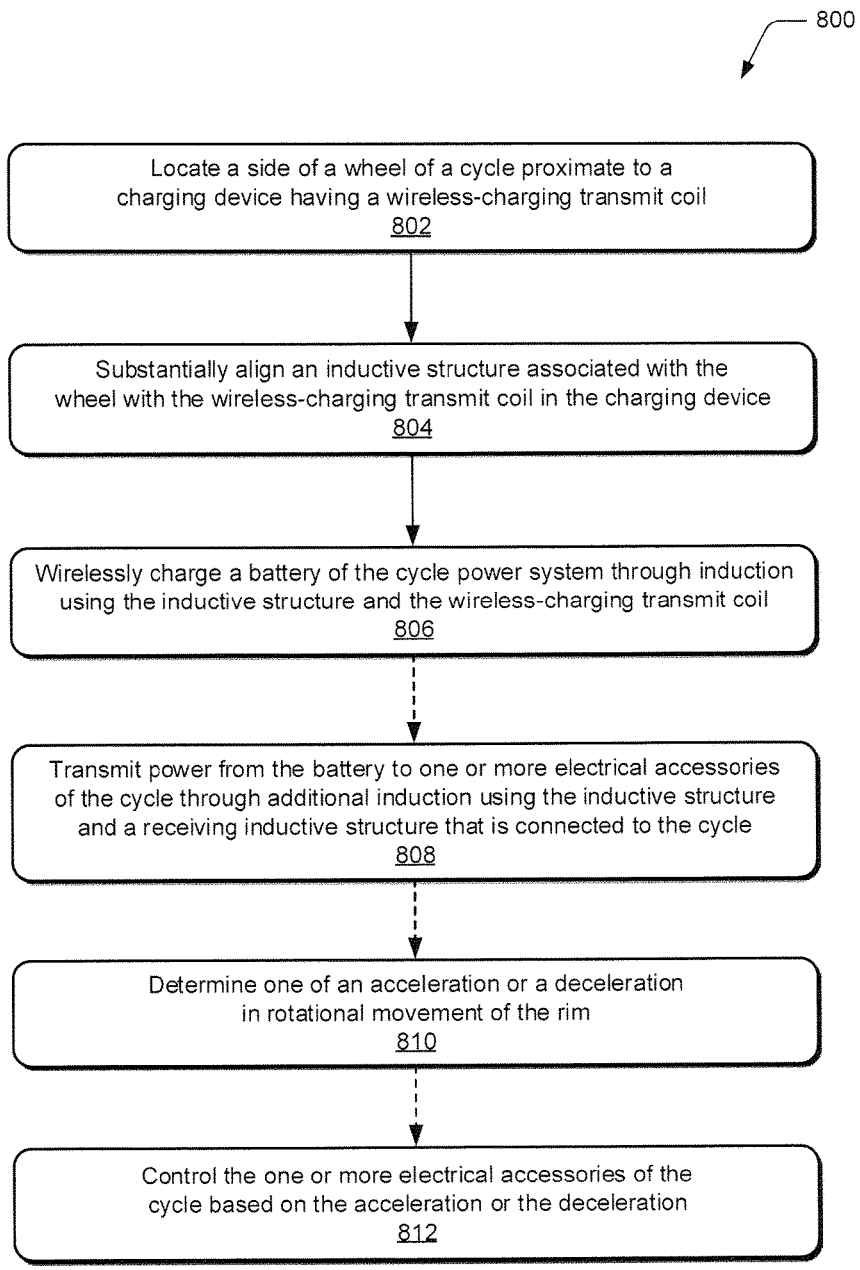
FIG. 8 depicts an example flow chart illustrating an example process for wireless power-transfer of a cycle power system in accordance with one or more embodiments.

FIG. 8 depicts a flow chart 800 illustrating an example process for wireless power-transfer of a cycle power system in accordance with one or more embodiments. A side of wheel of a cycle is located proximate to a charging device having a wireless-charging transmit coil (block 802). For example, the cycle can be parked such that the rear wheel of the cycle is next to the charging station. An inductive structure associated with the wheel is substantially aligned with the wireless-charging transmit coil in the charging device (block 804). In implementations, both inductive structures (e.g., the inductive structure associated with the wheel, and the wireless-charging transmit coil) are substantially aligned when the wheel of the cycle is parked next to the charging station.

A battery of the cycle power system is wirelessly charged through induction using the inductive structure and the wireless-charging transmit coil (block 806). For example, the inductive structure receives magnetic flux from the wireless-charging transmit coil in the charging station, and converts the magnetic flux into electrical current that is passed to the battery to charge the battery.

Power is transmitted from the battery to one or more electrical accessories of the cycle through additional induction using the inductive structure and a receiving inductive structure that is connected to the cycle (block 808). For example, the same inductive structure that received power during charging of the battery can also be used to transmit power during operation to power accessories, such as lights. This is accomplished through induction between the inductive structure and another inductive structure, such as a wheel-mounted or frame-mounted coil, as described above in relation to FIG. 5.

Acceleration or deceleration of rotational movement is determined (block 810). For example, the integrated drive system in the wheel can monitor the speed of the cycle, and/or calculate changes to the speed of the cycle. This information can be useful in determining which of a variety of different actions to perform based on whether the cycle is accelerating or decelerating. Examples include powering or controlling different accessories of the cycle, which are described above.

One or more electrical accessories of the cycle are controlled based on the acceleration or the deceleration (block 812). For example, a taillight can be activated, brightened, or flashed based on the deceleration of the wheel to act as a brake-light. Additionally, a headlight can be activated, or brightened when the cycle accelerates, thus brightening the user's field of view when traveling at greater speeds in low light.

Figure 9:
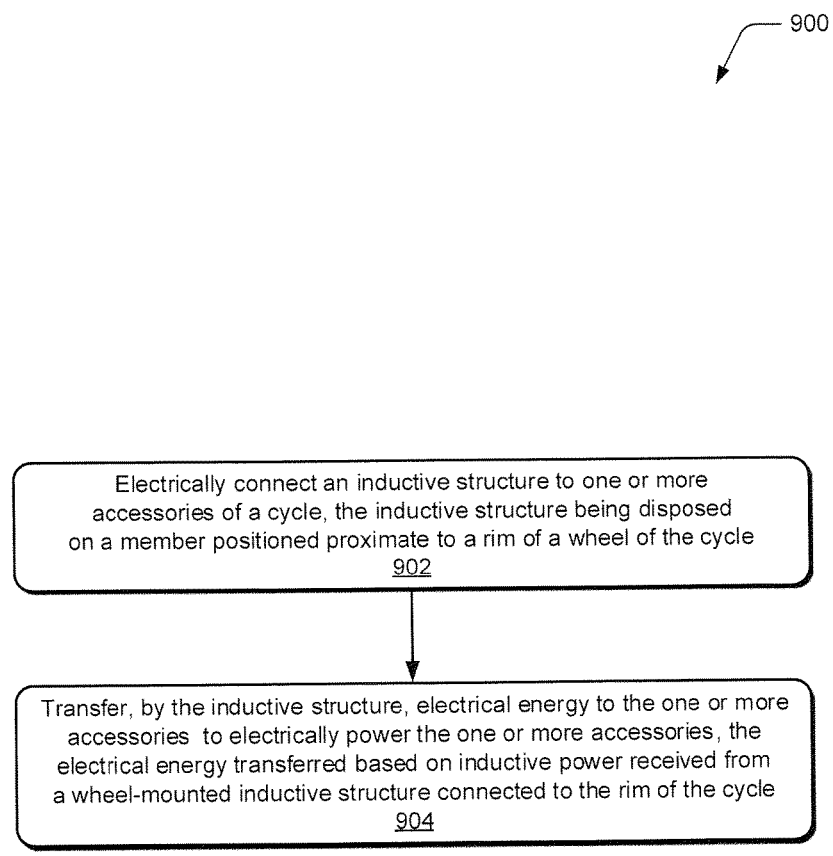
FIG. 9 depicts an example flow chart illustrating an example process for passive power-transfer in accordance with one or more embodiments.

FIG. 9 depicts an example flow chart 900 illustrating an example process for passive power-transfer in accordance with one or more embodiments. An inductive structure is electrically connected to one or more accessories of a cycle (block 902). In implementations, the inductive structure is disposed on a member that is configured to be positioned proximate to a rim of a wheel of the cycle. For example, the inductive structure can be disposed on a fender that is connected to a frame of the cycle, and the inductive structure can be connected to one or more accessories, such as a taillight, headlight, horn, mobile device, and so on.

Electrical current is transferred by the inductive structure to the one or more accessories through induction between the inductive structure and a wheel-mounted inductive structure that is connected to the rim of the cycle (block 904). In implementations, the power is transferred to electrically power the accessories of the cycle. For example, the inductive structure can receive magnetic flux from the wheel-mounted inductive structure, convert the magnetic flux into electrical current, and pass the electrically current to the accessories through a wired connection.

Although the present disclosure has been described in language specific to structural features and/or methodological acts, it is to be understood that the present disclosure defined in the appended claims is not necessarily limited to the specific features or acts described. Rather, the specific features and acts are disclosed as example forms of implementing the present disclosure as claimed.

What is claimed is:

1. A cycle power system, the cycle power system comprising:
   a sealed housing configured to rotate about an axis;
   a rim connected to the sealed housing and disposed concentrically with the sealed housing, the rim configured to receive a tire;
   an integrated drive system disposed within the sealed housing, the integrated drive system having a battery and a motor configured to cause rotational movement of the rim about the axis to drive a cycle; and
   an inductive structure disposed within the sealed housing, the inductive structure configured to wirelessly charge the battery using induction from a charging station, and configured to transmit power to one or more electrical accessories of the cycle through additional induction using the inductive structure and an additional inductive structure that is connected to the cycle.

2. The cycle power system of claim 1, wherein the inductive structure includes a coil-shaped structure disposed concentrically with the rim and the sealed housing.

3. The cycle power system of claim 1, wherein the inductive structure includes multiple coil-shaped structures.

4. The cycle power system of claim 1, wherein the sealed housing extends to the rim and is connected directly to the rim.

5. The cycle power system of claim 4, wherein the inductive structure is disposed on the rim.

6. The cycle power system of claim 1, wherein the cycle comprises one of a bicycle, a tricycle, a scooter, a motorcycle, or a rickshaw.

7. The cycle power system of claim 1, wherein the integrated drive system is configured to:
determine one of an acceleration or a deceleration in rotational movement of the rim; and
control one or more electrical accessories of the cycle based on the acceleration or the deceleration in rotational movement of the rim.

8. The cycle power system of claim 1, wherein the integrated drive system is configured to:
sense impedance shifts caused by a metal object approaching the inductive structure; and
control one or more electrical accessories of the cycle based on the impedance shifts caused by the metal object approaching the inductive structure.

9. The cycle power system of claim 8, wherein:
the one or more electrical accessories includes a light; and
the integrated drive system is configured to brighten or flash the light based on the impedance shifts.

10. A method for wireless power-transfer of a cycle power system, the method comprising:
locating a side of a wheel of a cycle proximate to a charging device having a wireless-charging transmit coil;
substantially aligning an inductive structure associated with the wheel with the wireless-charging transmit coil in the charging device, the inductive structure being disposed within a sealed housing that is positioned concentrically with a rim of the wheel;
wirelessly charging a battery of the cycle power system through induction using the inductive structure and the wireless-charging transmit coil, the battery being disposed within the sealed housing and configured to supply electrical energy to a motor disposed with the sealed housing, the motor configured to cause rotational movement of the rim of the wheel to drive the cycle; and
transmitting power from the battery to one or more electrical accessories of the cycle through additional induction using the inductive structure and a receiving inductive structure that is connected to the cycle.

11. The method of claim 10, further comprising:
detecting impedance shifts associated with a metal object approaching the inductive structure; and
controlling the one or more electrical accessories of the cycle based on the detected impedance shifts.

12. The method of claim 11, wherein:
the one or more electrical accessories includes a light; and
the light is controlled by flashing or brightening the light based on the detected impedance shifts.

13. The method of claim 10, wherein:
the sealed housing extends to the rim and is connected directly to the rim; and
the inductive structure is disposed on the rim.

14. The method of claim 10, wherein the cycle comprises one of a bicycle, a tricycle, a scooter, a motorcycle, or a rickshaw.

15. The method of claim 10, further comprising:
determining one of an acceleration or a deceleration in rotational movement of the rim; and
controlling one or more electrical accessories of the cycle based on the acceleration or the deceleration.

16. The method of claim 10, wherein the inductive structure includes a coil-shaped structure disposed concentrically with the rim of the cycle.

17. The method of claim 10, wherein the inductive structure includes multiple coil-shaped structures.

18. A passive power-transfer system, the passive power-transfer system comprising:
a member configured to be positioned proximate to a rim of a wheel of a cycle; and
an inductive structure connected to the member, the inductive structure configured to:
electrically connect to one or more accessories of the cycle; and
transfer electrical energy to the one or more accessories of the cycle to electrically power the one or more accessories, the electrical energy transferred based on inductive power received from a wheel-mounted inductive structure connected to the rim of the cycle.

19. The passive power-transfer system of claim 18, wherein the passive power-transfer system does not include a battery.

20. The passive power-transfer system of claim 18, wherein the member comprises a fender that is connectable to the cycle.

21. The passive power-transfer system of claim 18, wherein the member is connectable to a frame of the cycle.

22. The passive power-transfer system of claim 18, wherein the one or more accessories include at least one of a light, a horn, a mobile device, or an electronic payment device.

23. A method for passive power-transfer, the method comprising:
electrically connecting an inductive structure to one or more accessories of a cycle, the inductive structure being disposed on a member positioned proximate to a rim of a wheel of the cycle; and
transferring, by the inductive structure, electrical energy to the one or more accessories to electrically power the one or more accessories, the electrical energy transferred based on inductive power received from a wheel-mounted inductive structure connected to the rim of the cycle.

24. The method for passive power-transfer of claim 23, wherein the member comprises a fender connected to the cycle.

25. The method for passive power-transfer of claim 23, wherein the member comprises a portion of a frame of the cycle.

26. The method for passive power-transfer of claim 23, wherein the one or more accessories include at least one of a light, a horn, a mobile device, or an electronic payment device.

27. The method for passive power-transfer of claim 23, wherein the inductive structure includes a coil-shaped structure.

28. The method for passive power-transfer of claim 23, wherein the inductive structure is not physically connected to a battery.

* * * * *